US009611052B2

(12) United States Patent
Whitlock et al.

(10) Patent No.: US 9,611,052 B2
(45) Date of Patent: Apr. 4, 2017

(54) FASTENER SYSTEMS THAT PROVIDE EME PROTECTION

(71) Applicant: The Boeing Company, Chicago, IL (US)

(72) Inventors: Richard P. Whitlock, Seattle, WA (US); Peter A. Coronado, Renton, WA (US); Sean D. Morden, Federal Way, WA (US); Randall A. Rogers, Auburn, WA (US)

(73) Assignee: The Boeing Company, Chicago, IL (US)

( * ) Notice: Subject to any disclaimer, the term of this patent is extended or adjusted under 35 U.S.C. 154(b) by 719 days.

(21) Appl. No.: 14/073,806

(22) Filed: Nov. 6, 2013

(65) Prior Publication Data

US 2014/0055906 A1    Feb. 27, 2014

Related U.S. Application Data

(63) Continuation-in-part of application No. 13/434,835, filed on Mar. 29, 2012.

(51) Int. Cl.
| | | |
|---|---|---|
| *H05F 3/00* | (2006.01) | |
| *B64D 45/02* | (2006.01) | |
| *F16B 33/06* | (2006.01) | |
| *F16B 33/00* | (2006.01) | |

(52) U.S. Cl.
CPC ............ *B64D 45/02* (2013.01); *F16B 33/06* (2013.01); *F16B 33/004* (2013.01); *Y10T 29/49888* (2015.01)

(58) Field of Classification Search
CPC ..................................................... B64D 45/02
USPC .......................................................... 361/218
See application file for complete search history.

(56) References Cited

U.S. PATENT DOCUMENTS

| | | | | | |
|---|---|---|---|---|---|
| 4,383,218 | A | * | 5/1983 | Hansen ................ | G01N 27/023 324/225 |
| 4,502,092 | A | * | 2/1985 | Bannink, Jr. .......... | B64D 45/02 244/1 A |
| 4,556,439 | A | * | 12/1985 | Bannink, Jr. ......... | B29C 65/601 156/152 |
| 4,630,168 | A | | 12/1986 | Hunt | |
| 4,755,904 | A | * | 7/1988 | Brick ..................... | B64D 45/02 244/1 A |
| 5,018,920 | A | | 5/1991 | Speakman | |
| 6,665,922 | B2 | | 12/2003 | Schultz | |

(Continued)

FOREIGN PATENT DOCUMENTS

| | | |
|---|---|---|
| CA | 2865161 A1 | 11/2013 |
| EP | 2830948 A2 | 2/2015 |

(Continued)

OTHER PUBLICATIONS

Canadian Office Action for Related Patent Application No. 2,857,837; Report dated Jun. 10, 2016.

(Continued)

*Primary Examiner* — Stephen W Jackson
(74) *Attorney, Agent, or Firm* — Miller, Matthias & Hull LLP

(57) ABSTRACT

Fasteners are inserted into a stack of members and terminated with parts having at least one of a dry dielectric coating and an inner dry dielectric seal at select locations to protect against electromagnetic effects (EME).

29 Claims, 8 Drawing Sheets

(56) References Cited

U.S. PATENT DOCUMENTS

| | | |
|---|---|---|
| 7,599,164 B2 | 10/2009 | Heeter et al. |
| 7,695,226 B2 | 4/2010 | March et al. |
| 7,755,876 B2 | 7/2010 | Morrill et al. |
| 7,936,550 B2 | 5/2011 | Morrill et al. |
| 2009/0258220 A1 | 10/2009 | Schaaf et al. |
| 2010/0270513 A1 | 10/2010 | Haylock et al. |
| 2010/0272537 A1 | 10/2010 | Haylock et al. |
| 2010/0278616 A1 | 11/2010 | March et al. |
| 2012/0236457 A1 | 9/2012 | Yamakoshi |
| 2013/0259604 A1 | 10/2013 | Whitlock et al. |
| 2014/0055906 A1 | 2/2014 | Whitlock et al. |

FOREIGN PATENT DOCUMENTS

| | | |
|---|---|---|
| EP | 2871132 A1 | 5/2015 |
| WO | 2013176722 A2 | 11/2013 |

OTHER PUBLICATIONS

Mulazimoglu et al., "Recent Developments in Techniques to Miniminze Lightning Current Arcing Between Fasteners and Composite Structures", http://www.alcoa.com/fastening_systems/aerospace/en/pdf/Hasim_ICOSLE_2011.pdf, Sep. 2011.

* cited by examiner

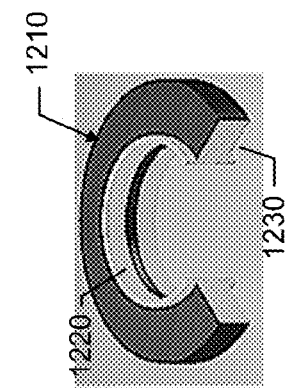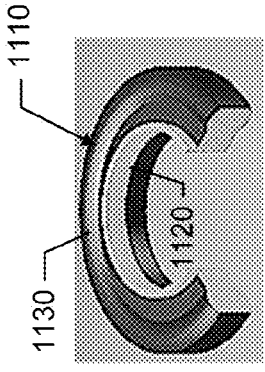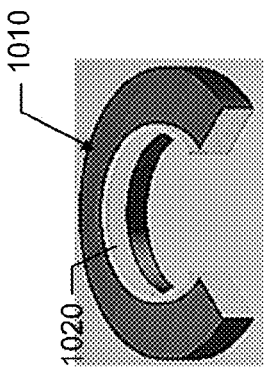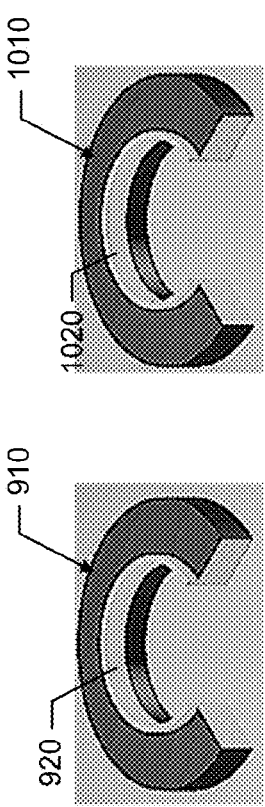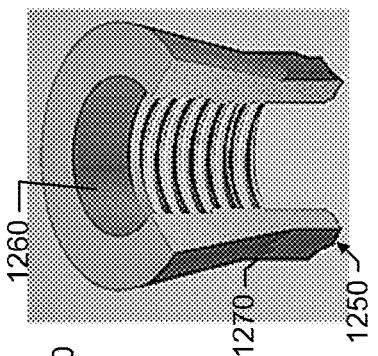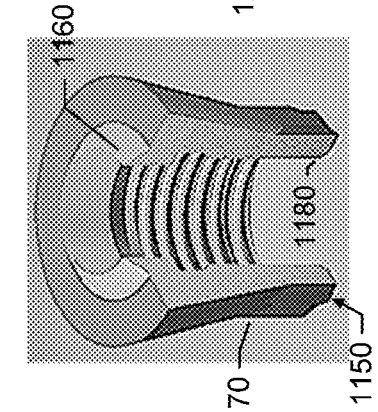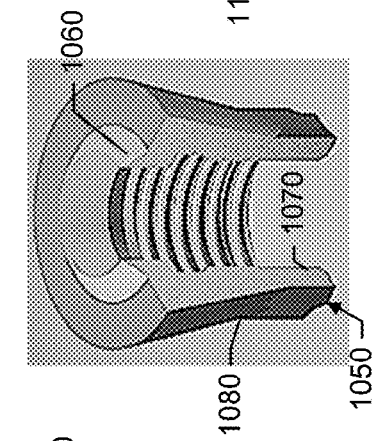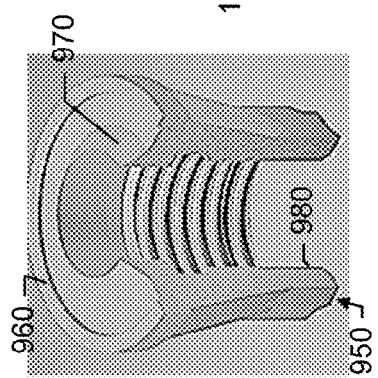
FIG. 9  FIG. 10  FIG. 11  FIG. 12

FASTENER SYSTEMS THAT PROVIDE EME PROTECTION

This is a continuation-in-part of U.S. Ser. No. 13/434,835 filed 29 Mar. 2012.

BACKGROUND

Lightweight composite materials hold promise for the aircraft industry. Fiber composites provide a significant improvement in specific strength and stiffness over conventional metal alloys. Better specific strength and stiffness translates into weight savings, which translates into fuel savings and lower operating costs. Additionally, composites do not corrode like aluminum, and they are more resistant to fatigue.

Composite aircraft structures do not readily conduct away the extreme electrical currents and electromagnetic forces generated by lightning strikes.

Composite aircraft structures may be configured with protection against electromagnetic effects (EME) from lightning strikes. For example, conductive media may be provided on a surface to divert lightning current away from underlying metal fastener systems. In addition, gaps between fastener parts, and gaps between fastener parts and structural members may be filled with dielectric sealant. Even if some current is not diverted, the sealant prevents arcing and sparking across the gaps.

SUMMARY

According to an embodiment herein, a method comprises inserting fasteners into a stack of members and terminating the fasteners with parts having at least one of a dry dielectric coating and an inner dry dielectric seal at select locations to protect against electromagnetic effects (EME).

According to another embodiment herein, a method comprises inserting fasteners into a stack of members and terminating the fasteners with parts having a combination of dry dielectric coating and a dry dielectric seal at select locations to protect against electromagnetic effects (EME) without using sealant.

According to another embodiment herein, a part for terminating a fastener comprises a fastener termination body having a central opening, and at least one feature for protecting against EME effects. The at least one feature includes at least one of a dielectric coating and a dielectric seal partially covering the central opening at a select location. The seal is secured to the body. The coating and the seal have a thickness and composition for inhibiting lightning current. The select location includes at least one of a distal location and a proximal location.

According to another embodiment herein, a fastening system comprises a fastener, at least one fastener termination part, and EME protective features for the fastener and each fastener termination part. The EME protective features are taken from the group consisting of a conductive resin coating on a shaft of the fastener, an interlocked dielectric cover on a head of the fastener, an inner dielectric seal on a proximal location of the fastener head, a dielectric seal on a distal location of the termination part, a dielectric seal on an proximal location of the termination part, a dielectric coating on a distal location of the termination part, and a dielectric coating on a proximal location of the termination part.

These features and functions may be achieved independently in various embodiments or may be combined in other embodiments. Further details of the embodiments can be seen with reference to the following description and drawings.

BRIEF DESCRIPTION OF THE DRAWINGS

FIGS. 9-12 are illustrations of different combinations of washers and nuts having EME protective features.

DETAILED DESCRIPTION

Figure 1:
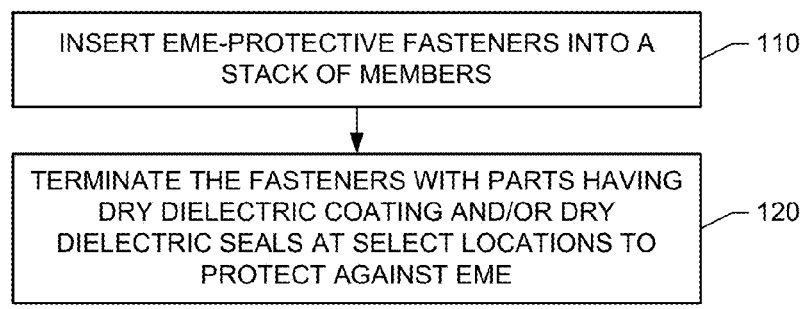
FIG. 1 is an illustration of a method of fastening a stack of members.

Reference is made to FIG. 1, which illustrates a method of fastening a stack of two or more members. In some embodiments, all of the members of the stack are made of metal (e.g., aluminum, titanium). In other embodiments, at least one of the members of the stack is made of composite material. For instance, an outer member is made of composite material and an inner member is made of metal. In other embodiments, all of the members of the stack may be made of composite material.

The method includes inserting fasteners into the stack (block 110). In some embodiments, the fasteners are inserted in pre-formed through-holes in the stack. In other embodiments, the fasteners are inserted without drilling holes. Fasteners may be countersunk into outer members whose outer surfaces require aero smoothness (e.g., aircraft skin). The fasteners may have EME protective features including dry dielectric layers interlocked to upper surfaces of fasteners heads, and dry dielectric seals on lower surfaces of the fasteners heads.

The method further includes terminating the fasteners with parts having EME protective features. The EME protective features for the termination parts include dry dielectric coatings and dry dielectric seals (e.g., dielectric sleeves) at select locations (block 120).

Without these EME protective features, arcing and sparking may occur. Arcing occurs when two parts are in near contact, and dielectric properties of the medium between break down due to high currents flowing between the parts. Sparking occurs when a high current ionizes air in a gap between two parts, the air breaks down, and current flows across the gap. Hot particle ejection occurs when a high current in a composite part causes composite material to chemically break down and generate hot expanding gas.

Both the dielectric coating and the dielectric seal prevent arcing and sparking by blocking the electrical bonding path between parts. The dielectric coating and the dielectric seal, alone and in combination, inhibit arcing and sparking across gaps between fastener parts (e.g., gap between fastener and nut, and gap between washer and nut) and gaps between fastener parts and structure (e.g., gaps between fastener and structure, nut and structure, and washer and structure). The dielectric seal performs the additional function of preventing hot gas from being ejected across gaps and keeping the gas within the fastening system.

In addition or in the alternative, some embodiments of the fasteners may reduce arcing, sparking and hot particle ejection by improving the electrical bonding path. In these embodiments, shafts of the fasteners may be coated with a conductive coating (e.g., a conductive resin) to improve the electrical bond between the fastener and stack and thereby reduce contact resistance. In some embodiments, the fasteners may be clearance fitted into the holes. In other embodiments, the fasteners may be interference-fitted into the holes. The interference fit improves electrical bonding between the fastener and stack (by increasing surface contact area), which reduces current densities and lowers overall path resistance.

The use of dry dielectric coating and seals on parts of a fastener system offers several advantages over the use of sealant to fill the gaps. The advantages include ease and speed of installation. The dry dielectric seals may be added and the coating may be coated onto the fastener parts prior to installation so that during fastening, the fasteners need only be installed. Extra steps, such as masking parts of the stack, injecting sealant, and curing the sealant, are eliminated.

Another advantage is a reduction in weight. The dry dielectric coatings and seals may be thinner than layers of sealant. In some embodiments, the thickness of the dielectric coating or seal may be 30 mils±10 mils. Moreover, less surface area is covered if an entire surface of a fastener part is not covered with a dry dielectric coating or dry dielectric seal.

Another advantage is redundant EME protection. Different embodiments of fasteners may be used in combination with different embodiments of termination parts (e.g., nuts and washers) to provide multiple levels of EME protection.

Figure 2:
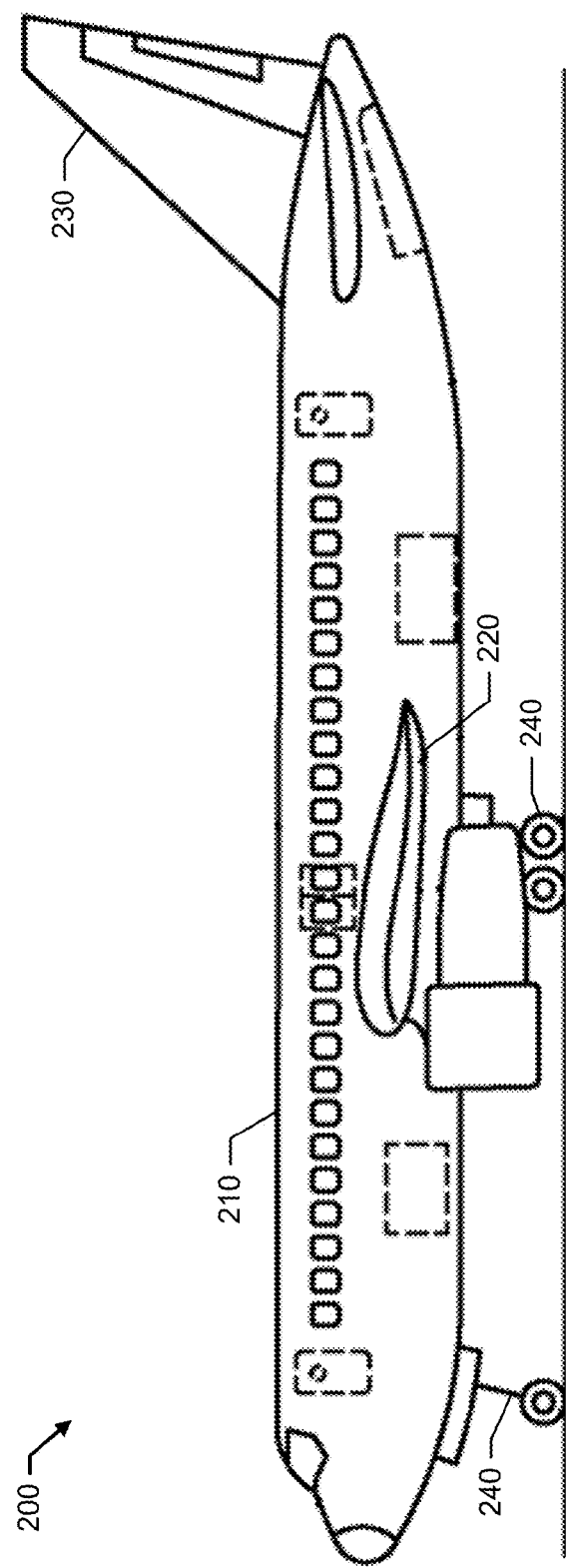
FIG. 2 is an illustration of a commercial aircraft.

These advantages are substantial with respect to a commercial aircraft, such as the commercial aircraft 200 illustrated in FIG. 2. The aircraft 200 includes a fuselage 210, wing assemblies 220, empennage 230, and landing gear assemblies 240. In this commercial aircraft 200, one million fastener systems might be used to fastener together the various components 210-240 and their subcomponents.

In certain locations of the aircraft 200, EME protection is desirable. For instance, EME protection is desirable for wing assemblies and other structures. To provide EME protection, the wing assemblies 220 may be assembled with as many as 20,000 fasteners according to a method herein. The benefits realized by weight savings and time and ease of installing those 20,000 fasteners are quite substantial.

In the following paragraphs, different types of EME-protective fastener parts will be described. These fasteners parts include fasteners and parts that terminate the fasteners (e.g., nuts and washers). These fastener parts may have dry dielectric coatings and/or dry dielectric seals at select locations to protect against EME.

First, the EME-protective fasteners will be described. Examples of fasteners include, but are not limited to, bolts and rivets.

Figure 3A:
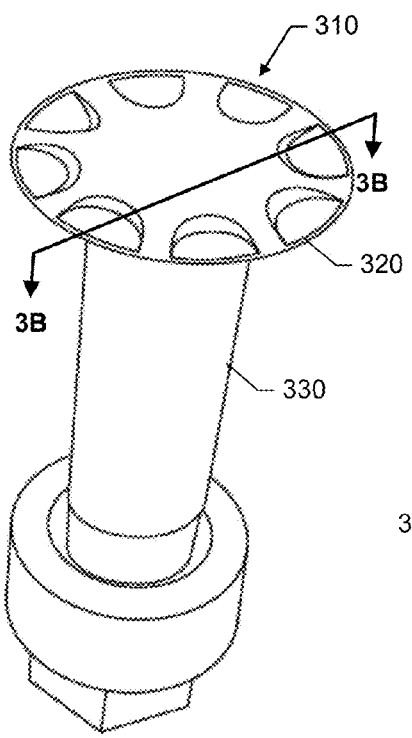
FIGS. 3A and 3B are illustrations of a first embodiment of an EME-protective fastener.
Figure 3B:
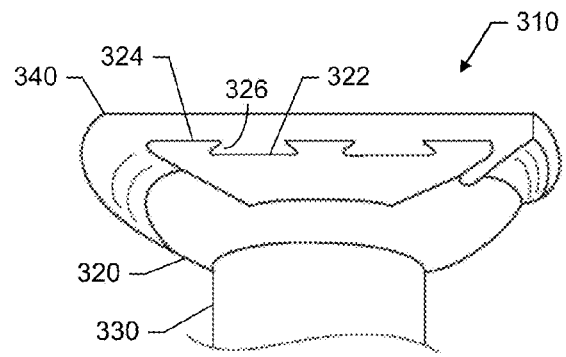

Reference is now made to FIGS. 3A and 3B, which illustrate a first embodiment of an EME protective fastener 310. FIG. 3B is a sectional view taken along lines 3B-3B in FIG. 3A. The fastener 310 includes a head 320, a shaft 330, and a dry dielectric layer 340. An upper surface 322 of the fastener head 320 has multiple mechanical interlocking sites that are configured to retain the dielectric layer 340. Each interlocking site includes a protrusion 324 extending upwards from the upper surface 322. The protrusion 324 has an undercut portion 326 proximate the upper surface 322. In the embodiment of FIGS. 3A and 3B, the protrusions 324 may be configured as spokes 324 that extend radially outward and have a cross section of an inverted triangle.

The dielectric layer 340 covers the fastener head 320. The dielectric layer 340 is not limited to any particular dielectric material. Examples include, but are not limited to, thermosets, thermoplastics, rubber, ceramics, and elastomers.

The dielectric layer 340 fills the undercut portions and all other space between the protrusions 324. The dielectric layer 340 is also in intimate contact with the upper surface 322 and the protrusions 324.

In some embodiments, the dielectric layer 340 may be formed by flowing a dielectric material over the fastener head 320. When the dielectric material flows over the surface 322, it fills the undercut portions 326 and all space between the protrusions 324. Once the dielectric material hardens, it is interlocked with the protrusions 324 and thereby secured to the fastener head 320. In other embodiments, the dielectric layer 340 may be formed by powder coating, painting, plating, spraying, sputtering, deposition, or any other process that allows the dielectric material to fill the undercut portions 326.

In this manner, the dielectric layer 340 is mechanically interlocked with the interlocking sites prior to fastener installation. The fastener 310 with the dielectric layer 340 is preinstalled to the head 320.

The interlocking of the dielectric layer 340 to the fastener head 320 is especially advantageous for lightning strikes. The interlocking ensures that the dielectric layer 340 maintains intimate contact with the fastener head 320 during and after lightning strike events.

Retention of the dielectric layer 340 may be enhanced. As a first example, the surface 322 may have roughness to enhance the retention to the dielectric layer 340. As a second example, the dielectric layer 340 may be made of a material (e.g., adhesive sealant) that adheres to the surface 322.

In other embodiments of EME-protective fasteners, the interlocking sites may have other cross-sections and they may be arranged in other patterns. Examples of other cross-sections include, but are not limited to square and circular cross-sections. Cross sections having areas of high stress concentration (e.g., corners) are not preferred. Rounded cross sections provide better mechanical properties.

An EME-protective fastener herein is not limited to any particular number of interlocking sites. However, it has been found that a range of five to nine interlocking sites provides a good balance between interlocking strength (with the dielectric layer) and fastener clamp-up strength.

Figure 4A:
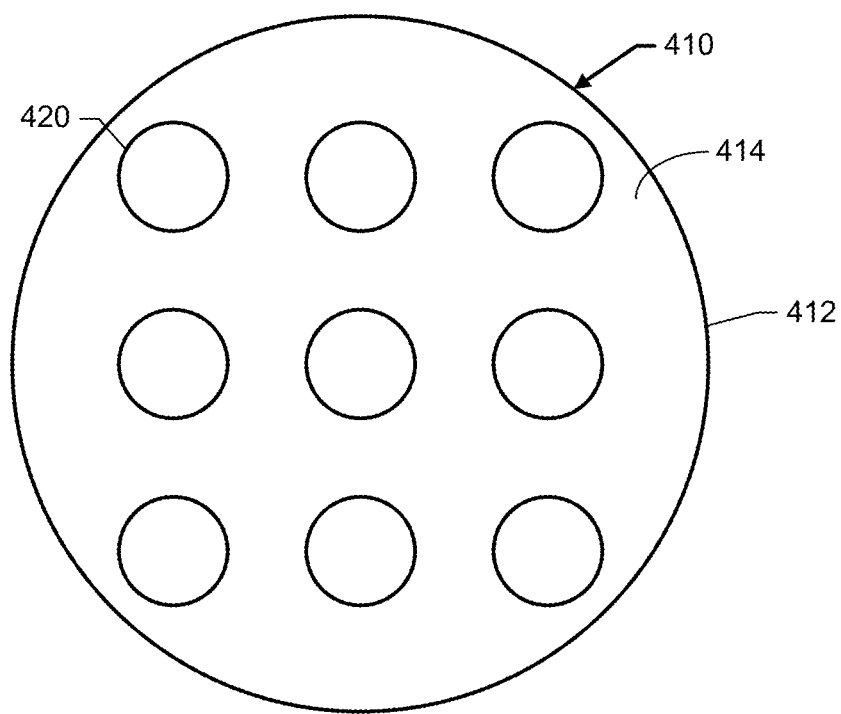
FIGS. 4A and 4B are illustration of a second embodiment of an EME-protective fastener.
Figure 4B:
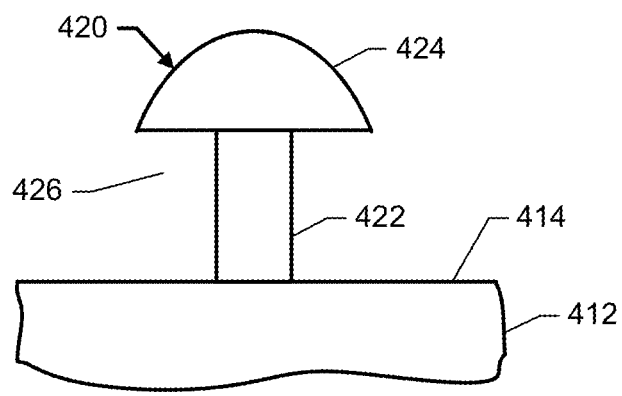

Reference is now made to FIGS. 4A and 4B, which illustrate a second embodiment of an EME-protective fastener 410. The EME-protective fastener 410 includes interlocking sites 420 arranged in a grid. Each interlocking site 420 includes a post 422 extending upward from an upper surface 414 of the fastener head 412. The post 422 terminates in a knob 424. The post 422 and the surfaces between the knob 424 and fastener head 412 define an undercut portion 426.

Figure 5:
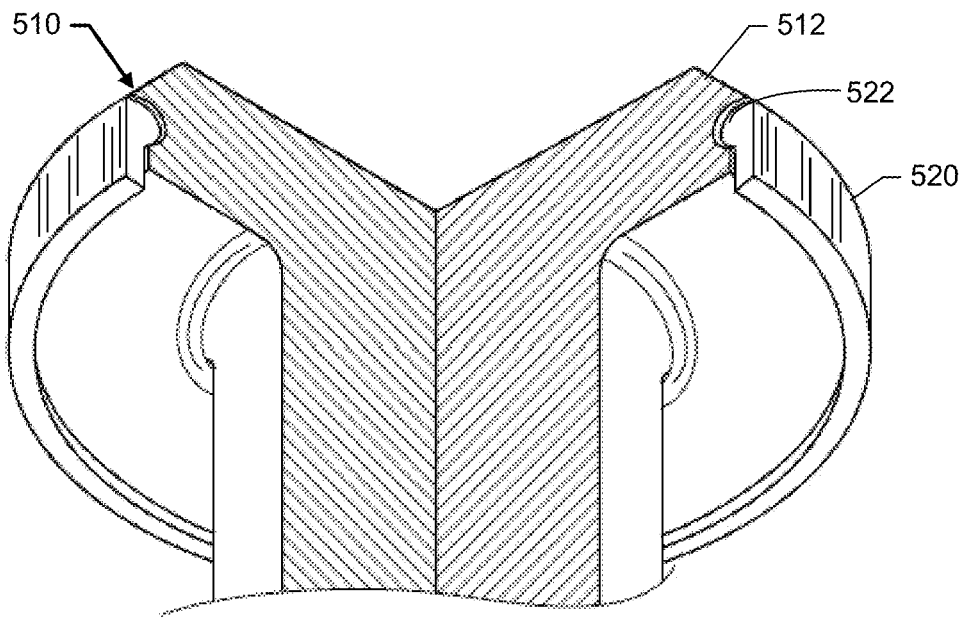
FIGS. 5 and 6 are illustrations of other embodiments of EME-protective fasteners.
Figure 6:
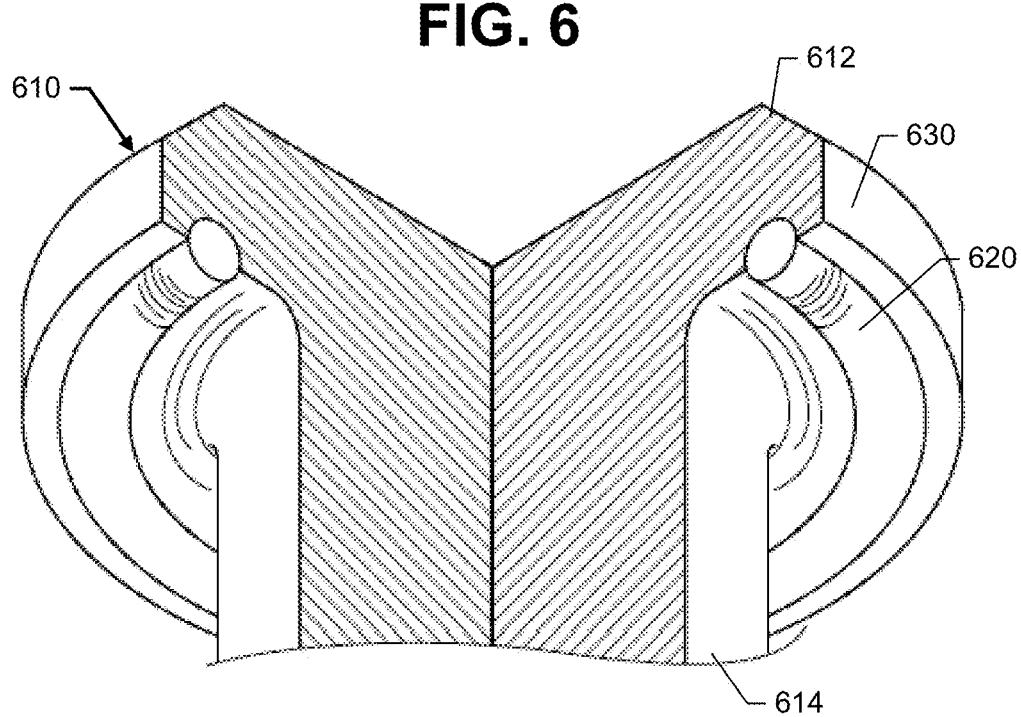

Reference is now made to FIGS. 5 and 6, which illustrate embodiments of fasteners 510 and 610 including heads 512 and 612 and dielectric seals 520 and 620. The seals 520 and 620 may be mechanically attached to the fastener heads 512 and 612. The seals 520 and 620 be made of a polymeric material such as polytetrafluoroethylene (PTFE), or thermoplastic polymers such as polyether ether ketone (PEEK) and polyamide-imides. When the fastener 510 or 610 is inserted into a stack and terminated, its seal 520 or 620 makes compressive contact with the stack.

In the fastener 510 of FIG. 5, the seal 520 fits around a periphery of the fastener head 512. The seal 520 may have a ridge 522 that fits into a groove in the fastener head 512. The seal 520 inhibits arcing and sparking at the edge of the fastener head 512, and it impedes hot expanding gas underneath the head 512 from escaping.

In the fastener 610 of FIG. 6, the seal 620 has the shape of an O-ring and fits in a groove in an underside of the fastener head 612. The seal 620 inhibits arcing and sparking, and it impedes escape of any hot expanding gas between the stack and the fastener's shaft 614. The upper surface and side of the fastener head 612 may be covered with a dielectric coating 630 to prevent arcing and sparking at the edge of the fastener head 612.

Figure 7:
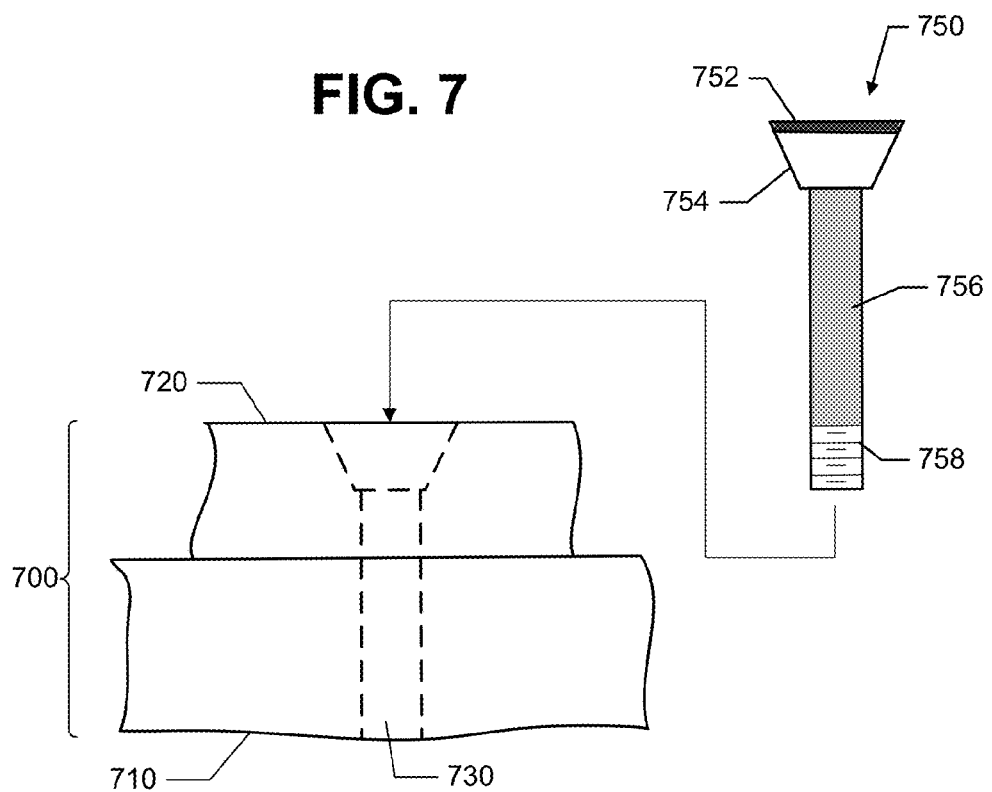
FIG. 7 is an illustration of a stack including a composite member and a conductive layer.

Reference is now made to FIG. 7, which illustrates a stack 700 including a composite member 710 and a conductive layer 720 (e.g., metal strips, expanding foil) that covers the composite member 710. An EME-protective fastener 750 is inserted into a through-hole 730 in a composite member 710 and countersunk into the conductive layer 720. The dielectric layer 752 on the fastener's head 754 is flush with the conductive layer 720.

In some embodiments, the entire unthreaded portion of the fastener's shaft 758 may be coated with a dry conductive resin coating 756 (shaded in gray) having electrically conductive particles dispersed in a polymer matrix. Examples of the conductive particles include, but are not limited to, metal particles, and nanotubes. It has been found that the resin, in combination with an interference fit, improves the electrical bond path between the fastener 750 and the composite member 710. The resin fills voids between the fastener shaft 758 and the composite member 710. By doing so, the resin increases the effective contact area with fibers of the composite member 710.

The fastener 750 may have an anti-rotation feature that prevents it from rotating within the through-hole 730 and damaging the dielectric layer 752 as it is being terminated (e.g., as a nut is being wrenched onto the fastener 750). Examples of anti-rotation measures include, but are not limited to, creating an interference (or friction) fit between the fastener shaft 758 and the member 710; providing the shaft 758 with a cross-sectional shape that prevents rotation (e.g., a hexagonal shape for the shaft and through-hole), and keying the shaft 758 to the member 710.

Fasteners herein may be used anywhere in an aircraft. As examples, fasteners herein may be used in door surrounds, electrical equipment housing, and parts that are subject to ground fault currents. Fasteners herein may be terminated with standard parts (e.g., standard nuts) or they may be terminated with EME-protective parts herein.

In the following paragraphs, different types of EME-protective fastener termination parts will be described. These parts include collars and washers. The types of collars described in the following paragraphs are nuts, which having wrenching features that enable installation and removal. However, collars herein may have frangible wrenching features or they may be swaged on.

Figure 8:
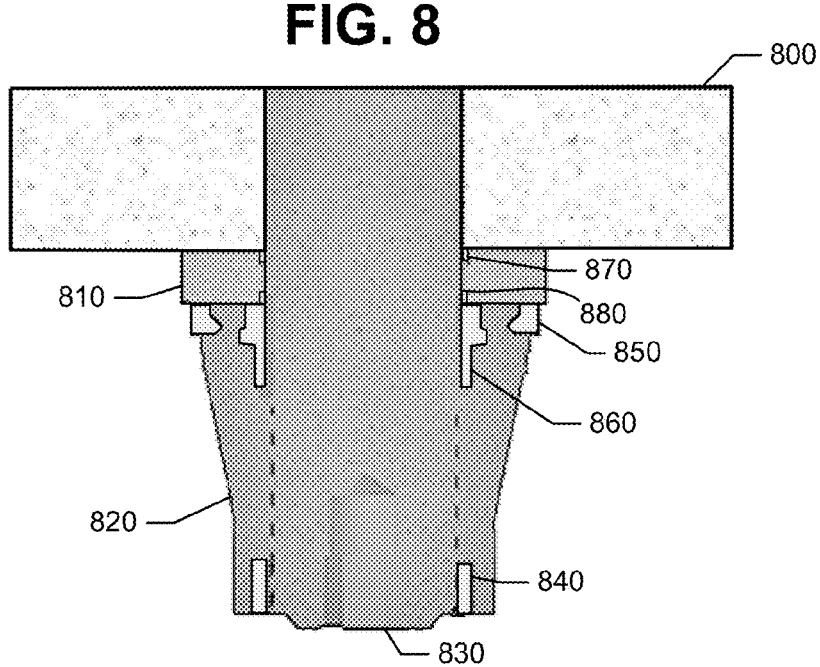
FIG. 8 is an illustration of select EME protection locations on a nut.

Reference is now made to FIG. 8, which illustrates a fastener 830 extending through a member of a stack 800, and a washer 810 and nut 820 that terminate the fastener 830. FIG. 8 also illustrates various locations on the washer 810 and nut 820 that may be covered with a dry dielectric coating or dielectric seal to protect against EME. The locations on the nut 820 include an inner distal location 840, an outer proximal location 850, and an inner proximal location 860. The locations on the washer 810 include an inner proximal location 870 and an inner distal location 880. The terms "proximal" and "distal" refer to the distance from the stack 800. For instance, the proximal location of the nut 820 is closer to the stack 800 than the distal location. The terms "inner" and "outer" refer to the distance from the fastener shaft.

Instead of covering the entire washer 810 and nut 820 with sealant to protect against EME, only one or more of these locations 840-880 may be coated or sealed with dry dielectric material.

A seal protrudes axially from the body of the fastener termination part. In some embodiments, the seal protrudes at least 7 mils from the body. The seal may be made of a polymeric material such as polytetrafluoroethylene (PTFE), or thermoplastic polymers such as polyether ether ketone (PEEK) and polyamide-imides. The seal may be mechanically attached by using protrusions and undercuts that allow polymeric material to flow into the undercuts.

In some embodiments, an exterior surface of the body is coated with a dielectric coating. Examples of compositions for the dielectric coating include, but are not limited to, thermosets, thermoplastics, ceramics, glass, and elastomers. The dielectric coating may be applied by a process such as anodic conversion coating (e.g., plasma electrolyte oxidation), which is an electrochemical surface conversion treatment. Other processes for applying the dielectric include, but are not limited to, powder coating, spraying, plating, sputtering, and deposition.

Reference is made to FIG. 9, which illustrates a combination including a washer 910 having a seal 920 at the inner proximal location. The distal location is not covered. The outer surface of the washer 910 is coated with a dielectric material.

The combination also includes a nut 950 having a seal 960 at the outer proximal location, a seal 970 at the inner proximal location, and a dielectric coating 980 at the distal location. There is no dielectric coating on the exterior surface of the nut 950.

When the nut 950 and the washer 910 are mated with the stack, the inner proximal seal 920 of the washer 910 is pressed against the stack, and the inner proximal seal 970 of the nut 950 is received in the central opening of the washer 910. As the nut 950 is tightened, the washer seal 920 folds back and is crushed against the stack, thereby filling any voids between the washer 910 and the stack.

Reference is made to FIG. 10, which illustrates a combination including a washer 1010 having a seal 1020 at the inner proximal location, and a nut 1050 having a seal 1060 at the inner proximal location, a dielectric coating 1070 at the distal location, and a dielectric coating 1080 on the outer surface (instead of a seal at the outer proximal location).

Reference is made to FIG. 11, which illustrates a combination including a washer 1110 having a seal 1120 at the inner proximal location, and a concentric ridge 1130 formed at a periphery of the washer 1110. The combination also includes a nut 1150 having a seal 1160 at the inner proximal location, a dielectric coating 1170 on the outer surface (instead of a seal at the outer proximal location), and a seal 1180 at the inner distal location.

When the nut 1150 and the washer 1110 are mated with the stack, the inner proximal seal 1120 and the ridge 1130 of the washer 1110 are pressed against the stack, and the inner proximal sleeve 1160 of the nut 1150 is received in the central opening of the washer 1110. As the nut 1150 is tightened, the inner proximal seal 1120 of the washer 1110 folds back and is crushed against the stack. The concentric ridge 1130 also maintains a seal between the washer 1110 and the stack, even if the proximal face of the washer 1110 is not parallel with the bottom face of the stack.

Reference is now made to FIG. 12, which illustrates a combination including a washer 1210 having seals 1220 and 1230 at the inner proximal and distal locations. There is a gap between these seals 1220 and 1230. The combination further includes a nut 1250 with a dielectric coating 1270 over the entire exterior surface, and a coating 1260 at the inner proximal location.

When the nut 1250 and the washer 1210 are mated with the stack, the proximal seal 1220 of the washer 1210 is pressed against the stack, and the distal seal 1230 of the washer 1210 is received in the inner proximal location of the nut 1250. As the nut 1250 is tightened, the proximal seal 1220 of the washer 1210 folds back and is crushed against the stack, and the distal seal 1230 of the washer 1210 folds back and is crushed against the nut 1250.

Concentric ridges are not limited to the periphery of a washer herein. Other embodiments of washers may have concentric ridges at intermediate and inner portions of the washer's upper face. Some embodiments may have concentric ridges on both faces.

In some embodiments, a concentric ridge may be formed by stamping a concentric groove in the washer, and filling the groove with a dielectric ring. In other embodiments, a metal ridge may be stamped in the washer.

Although FIGS. 9-12 illustrate nuts 950, 1050, 1150, 1250 that are open at both ends, a nut herein is not so limited. For instance, one end of a nut herein may be closed to form a cap. The cap may be made of a dielectric material, or the cap may be made of metal with its inner surface coated with a dielectric material. Such a cap would provide additional protection against distal arcing and sparking.

The nuts 950, 1050, 1150, 1250 of FIGS. 9-12 do not have counterbores. However a nut herein may have a counterbore.

Figure 13:
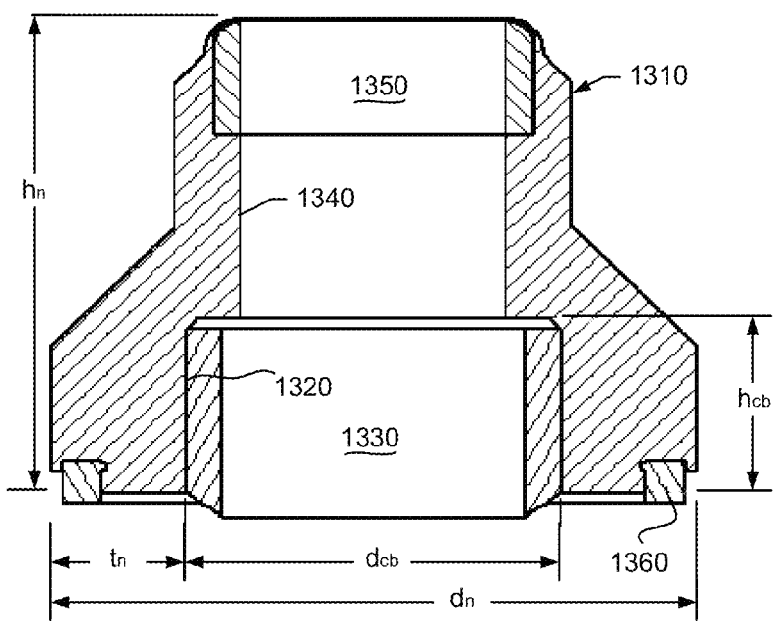
FIG. 13 is an illustration of a nut having a counterbore and an outer proximal seal.

Reference is now made to FIG. 13, which illustrates a nut 1310 having a counterbore 1320 and an inner proximal seal 1330 inside the counterbore 1320. The nut 1310 also has a threaded portion 1340 for engaging threads of a fastener, and a threaded locking feature 1350 at a distal end of the threaded portion 1340. The nut 1310 also has an outer proximal seal 1360. The nut 1310 may be fully coated with a dielectric coating.

The applicants conducted lightning strike tests on nuts 1310 having counterbores 1320 with different dimensions, and discovered ranges of counterbore heights ($h_{cb}$) and diameters ($d_{cb}$) that provide particularly effective protection against EME. The lightning strike tests were conducted on nuts 1310 having a height of about 0.45 inches and an outer diameter of about 0.51 inches. During the tests, high currents were injected through coupons fastened together by a fastener and a nut 1310, while arcing and sparking were observed. The tests revealed that a counterbore height ($h_{cb}$) ranging between 0.014 inches and 0.264 inches, and a counterbore diameter ($d_{cb}$) ranging between 0.260 inches and 0.400 inches exhibited a 293% kA percent performance increase over a 0.300 inch counterbore, or an 18 kA increase before failures in the form of arcs and sparks were observed.

It is believed that this range of diameters ($d_{cb}$) provides clearance between the nut 1310 and fastener to prevent incidental contact that allows electrical continuity to drive lightning currents into the nut 1310. Consequently, edge and/or pintail arcing are prevented. It is believed that this range of heights ($h_{cb}$) creates clearance between the fastener pin and/or fastener sleeve to prevent incidental contact that allows electrical continuity to drive lightning currents into the nut. Consequently, edge and/or pintail arcing are prevented.

These test results apply to nuts 1310 of different sizes. The applicants have discovered that a counterbore height ($h_{cb}$) between about 3.1% to 59.0% of nut height ($h_n$), and a counterbore diameter ($d_{cb}$) between 51.4% and 79.05% of nut diameter ($d_n$) provide a similar increase in EME protection.

Figure 14:
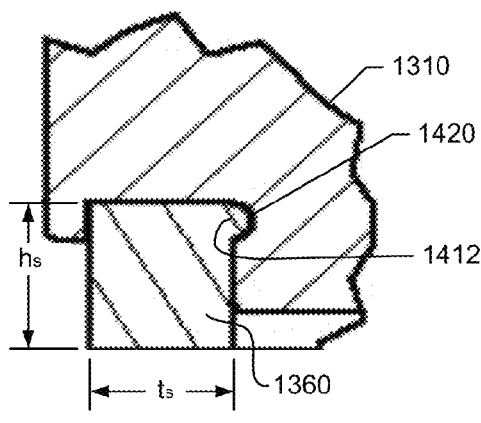
FIGS. 14 and 15 are illustrations of outer proximal seals without and with metal backings.

Additional reference is made to FIG. 14. The outer proximal seal 1360 has a height denoted by $h_s$ and a thickness denoted by $t_s$.

The applicants conducted lightning strike tests on nuts 1310 having outer proximal seals 1360 with different dimensions, and discovered ranges of heights ($h_s$) and thicknesses ($t_s$) that provide particularly effective protection against EME. The lightning strike tests were conducted on nuts 1310 having a height of about 0.45 inches and an outer diameter of about 0.51 inches. The nuts 1310 under test were fully coated with a dielectric coating, and they had counterbores, inner proximal seals, and inner distal seals. The outer proximal seals 1360 under test were made of Torlon® polyamide-imide. During the tests, high currents were injected through coupons fastened together by a fastener and a nut 1310, while arcing and sparking were observed. The tests revealed that outer proximal seals 1360 having a thickness ($t_s$) ranging between 0.010 inches and 0.075 inches, and a height ranging ($h_s$) between 0.010 and 0.100 inches exhibited a 3500% kA percent performance increase over a baseline configuration having no seals, or a 44 kA increase before failures in the form of arcs and sparks were observed.

These test results apply to nuts of different sizes. The applicants have discovered that an outer seal thickness ($t_s$) between about 2.0% to 15.0% of nut diameter ($d_n$), and an outer seal height ($h_s$) between 2.2% and 22.3% of nut height ($h_n$) provide a similar increase in EME protection.

Figure 15:
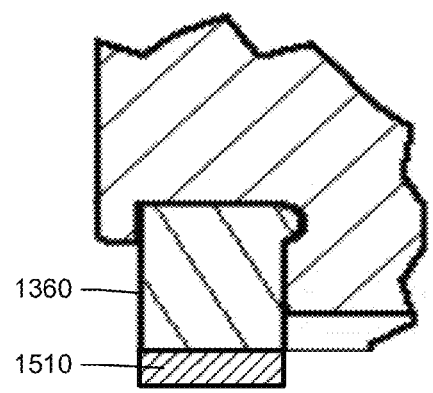

FIGS. 13 to 15 also illustrate a retention channel 1420 for retaining the outer proximal seal 1360. The outer proximal seal 1360 has a substantially rectangular shape, except for a portion 1412 filling the retention channel 1420.

Reference is now made to FIG. 15. In some embodiments, the outer proximal seal 1360 may also have a metal backing 1510 on the seal 1360. The metal backing 1510 can keep the outer proximal seal 1360 intact during a lightning event, and it has been found to reduce breakage of the seal 1360.

A fastening system herein is not limited to the combinations of fasteners, nuts and washers described above. A variety of EME protective features may be mixed and matched. Multiple parts having different features may be used. For example, the EME protective features may be taken from the group consisting of a conductive resin coating on a shaft of the fastener, an interlocked dielectric cover on a head of the fastener, a dielectric seal on a proximal location of the fastener head, a dielectric seal on a distal location of the termination part, a dielectric seal on an proximal location of the termination part, a dielectric coating on a distal location of the termination part, and a dielectric coating on a proximal location of the termination part.

Figure 16:
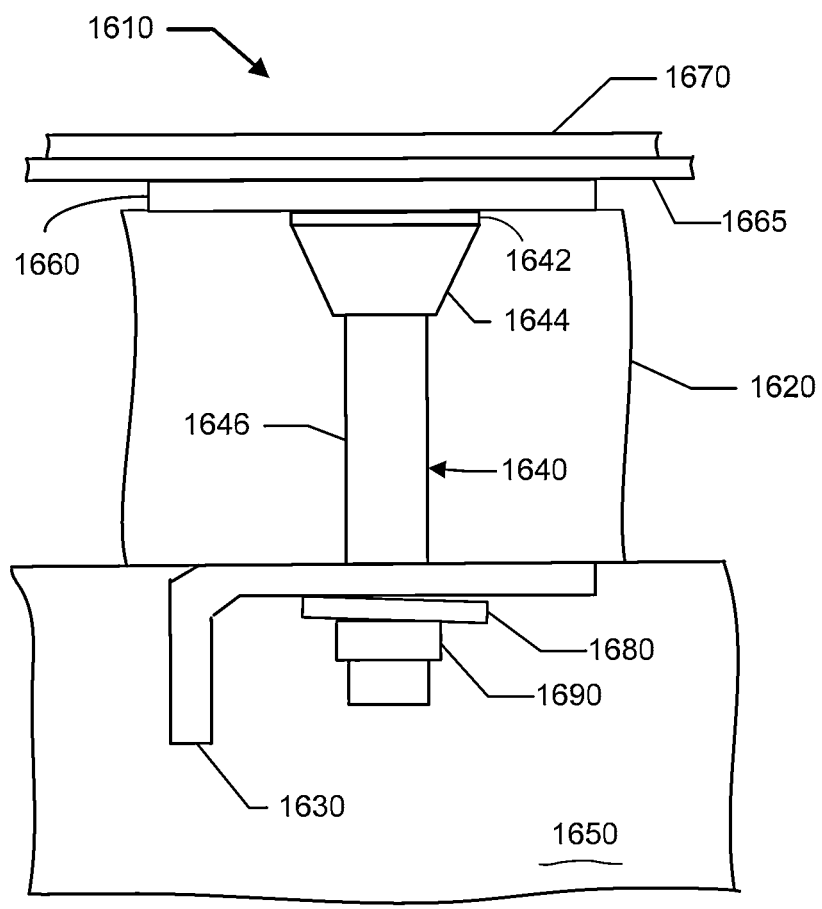
FIG. 16 is an illustration of an aircraft structure.

Reference is now made to FIG. 16, which illustrates a portion of an aircraft wing 1610. The wing 1610 includes skin 1620 made of a composite material such as carbon fiber reinforced plastic (CFRP). The skin 1620 may be fastened to a substructure (represented by the bracket) 1630 by fastener parts 1640, 1680 and 1690. The skin 1620 defines a lightning susceptible area 1650.

Each fastener 1640 has a dielectric layer 1642 that is interlocked with a fastener head 1644. Each fastener 1640 may have a conductive resin coating on its shaft 1646.

Each fastener 1640 is countersunk into the skin 1620. The dielectric layer 1642 is flush with the upper surface of the skin 1620. A metal foil 1660 covers the skin 1620 to dissipate EME current. A surfacing film (e.g., a glass-epoxy layer) 1665 is applied over the skin 1620, and the surfacing film 1665 is covered with paint 1670.

Each fastener 1640 is terminated with a washer 1680 and a nut 1690. The washer 1680 and the nut 1690 have various EME protective features.

There might be tens of thousands of fasteners 1640, washers 1680, and nuts 1690 in the wing 1610. By using EME protective features herein instead of injecting sealant, the savings in installation time is substantial. The reduction in weight is also substantial.

FIG. 16 illustrates the surface of the washer 1680 and bracket 1630 being slightly skewed. If the washer 1680 is provided with an upper sleeve or a concentric ridge on the upper surface, any gap between the washer 1680 and bracket 1630 will be filled with dielectric material and sealed.

Similarly, if the nut 1690 is slightly skewed with respect to the washer 1680, or if a washer 1680 is not used and the nut 1690 is slightly skewed with respect to the upper surface, any gap between the nut 1690 and washer 1680 or nut 1690 and stack will be filled with dielectric material and sealed.

Thus, the EME protective features provide the added advantage of making the structure less dependent on geometry. Even if mating surfaces of the termination parts aren't perfectly flush, EME protection is still provided.

The invention claimed is:

1. A method comprising inserting fasteners into a stack of members and terminating the fasteners with parts having at least one of a dry dielectric coating and an inner dry dielectric seal at select locations to protect against electromagnetic effects (EME).

2. The method of claim 1, wherein the seal is used to protect against arcing, sparking and hot particle ejection; and wherein the coating is used to protect against arcing and sparking.

3. The method of claim 1, wherein the members are aircraft members, at least one of which is made of composite material.

4. The method of claim 1, wherein the members include aircraft skin and a metal member.

5. The method of claim 1, wherein at least one of the fasteners is interference-fitted into a through hole in the stack.

6. The method of claim 1, wherein terminating the fasteners includes using at least one part having a central opening and at least one EME protective feature including a dry dielectric coating and a dry inner dielectric seal, the seal secured to and protruding axially from the central opening.

7. The method of claim 1, wherein at least some of the fasteners are terminated with a combination of a washer and nut, the washer having an inner proximal seal and an outer surface coated with a dielectric coating, the nut having an outer proximal seal, an inner proximal seal, and an inner distal dielectric coating.

8. The method of claim 1, wherein at least some of the fasteners are terminated with a combination of a washer and nut, the washer having an inner proximal seal, the nut having an inner proximal seal, an inner distal dielectric coating, and an exterior dielectric coating.

9. The method of claim 1, wherein at least some of the fasteners are terminated with a combination of a washer and nut, the washer having an inner proximal seal and a concentric ridge at a periphery of the washer, the nut having an inner proximal seal, an inner distal seal, and an exterior dielectric coating.

10. The method of claim 1, wherein at least some of the fasteners are terminated with a combination of a washer and nut, the washer having outer and inner proximal seals, the nut having an exterior dielectric coating and an inner proximal coating.

11. The method of claim 1, wherein at least some of the fasteners are terminated with nuts having a counterbore, height of the counterbore being between about 3.1% to 59.0% of nut height, diameter of the counterbore being between about 51.4% and 79.05% of nut diameter.

12. The method of claim 1, wherein at least some of the fasteners are terminated with a nut having an outer dielectric seal at a proximal location, the seal having a thickness between about 2.0% to 15.0% of nut diameter, and a height between about 2.2% and 22.3% of nut height.

13. A method comprising inserting fasteners into a stack of members and terminating the fasteners with parts having a combination of dry dielectric coating and a dry dielectric seal at select locations to protect against electromagnetic effects (EME) without using sealant.

14. A part for terminating a fastener, the part comprising:
a fastener termination body having a central opening; and
at least one feature for protecting against EME effects, the at least one feature including at least one of a dry dielectric coating and a dielectric seal partially covering the central opening at a select location, the seal secured to the body, the coating and the seal having a thickness and composition for inhibiting lightning current, the select location including at least one of a distal location and a proximal location.

15. The part of claim 14, wherein the seal protrudes axially at least 7 mils from the body.

16. The part of claim 14, further comprising a dielectric coating completely covering an exterior surface of the body.

17. The part of claim 14, wherein the part is a collar.

18. The part of claim 17, wherein the dielectric seal is at a distal location on the collar.

19. The part of claim 17, wherein collar's body further has counterbore, height of the counterbore being between about 3.1% to 59.0% of collar height, diameter of the counterbore being between about 51.4% and 79.05% of collar diameter.

20. The part of claim 17, further comprising an outer dielectric seal on the body at a proximal location, the seal having a thickness between about 2.0% to 15.0% of collar diameter, and a height between about 2.2% and 22.3% of collar height.

21. The part of claim 20, wherein the collar has a retention channel for retaining the outer proximal seal, and a metal backing outboard of the seal.

22. The part of claim 17, wherein the at least one feature includes both the dielectric coating and the dielectric seal.

23. The part of claim 14, wherein the part is a washer.

24. The part of claim 23, wherein the at least one feature includes the dielectric seal partially covering the central opening at a proximal location of the washer.

25. The part of claim 24, wherein the at least one feature further includes a second seal covering the central opening at a distal location of the washer, the seals separated by a gap.

26. The part of claim 25, further comprising a dielectric coating on an exterior surface of the washer.

27. The part of claim 24, further comprising a concentric ridge protruding from at least one face of the washer.

28. A fastening system comprising a fastener, at least one fastener termination part, and EME protective features for the fastener and each fastener termination part, the EME protective features taken from the group consisting of:
- a conductive resin coating on a shaft of the fastener;
- an interlocked dielectric cover on a head of the fastener;
- an inner dielectric seal on a proximal location of the fastener head;
- a dielectric seal on a distal location of the termination part;
- a dielectric seal on a proximal location of the termination part;
- a dielectric coating on a distal location of the termination part; and
- a dielectric coating on a proximal location of the termination part.

29. The fastening system of claim 28, wherein the dielectric seal is used to protect against arcing, sparking and hot particle ejection; and wherein the dielectric coating is used to protect against arcing and sparking.

\* \* \* \* \*